United States Patent
Karasawa et al.

(10) Patent No.: US 7,304,282 B2
(45) Date of Patent: Dec. 4, 2007

(54) FOCUS DETECTION DEVICE AND FLUORESCENT OBSERVATION DEVICE USING THE SAME

(75) Inventors: Masayoshi Karasawa, Hachioji (JP);
Atsuhiro Tsuchiya, Hachioji (JP);
Takashi Yoneyama, Sagamihara (JP);
Kenichi Koyama, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/328,028

(22) Filed: Jan. 9, 2006

(65) Prior Publication Data
US 2006/0157637 A1    Jul. 20, 2006

(30) Foreign Application Priority Data
Jan. 20, 2005  (JP) .............................. 2005-012824

(51) Int. Cl.
*G02B 7/04* (2006.01)
(52) U.S. Cl. .................................. 250/201.4
(58) Field of Classification Search .. 250/201.2–201.8, 250/458.1
See application file for complete search history.

(56) References Cited

U.S. PATENT DOCUMENTS 6,594,011 B1 * 7/2003 Kempen ..................... 356/369
2004/0113043 A1 * 6/2004 Ishikawa et al. ......... 250/201.4

FOREIGN PATENT DOCUMENTS

JP          2003-270524 A     9/2003
WO         WO 03/077008    *  9/2003

* cited by examiner

*Primary Examiner*—Thanh X. Luu
(74) *Attorney, Agent, or Firm*—Frishauf, Holtz, Goodman & Chick, P.C.

(57) ABSTRACT

A focus detection device which is applied to a fluorescent observation device for observing a fluorescent image to be emitted from an observation sample on the basis of an evanescent light, includes an image pickup unit which detects a contrast of the fluorescent image by imaging the fluorescent image, and a detector which detects a focus on the basis of the detection result.

7 Claims, 9 Drawing Sheets

FOCUS DETECTION DEVICE AND FLUORESCENT OBSERVATION DEVICE USING THE SAME

CROSS-REFERENCE TO RELATED APPLICATIONS

This application is based upon and claims the benefit of priority from prior Japanese Patent Application No. 2005-012824, filed Jan. 20, 2005, the entire contents of which are incorporated herein by reference.

BACKGROUND OF THE INVENTION

1. Field of the Invention

The present invention relates to a focus detection device and a fluorescent observation device using the focus detection device, and particularly, the present invention relates to a microscope and an optical device etc. for fluorescent-observing a live cell with a high contrast, which can detect a boundary face between a glass surface on which an observation sample as an observation object is mounted and an observation example with a high degree of accuracy.

2. Description of the Related Art

In a study field of biology, a function of the interior of the cell and the structure of the cell have been analyzed by using a fluorescent observation method. However, since an illumination light is irradiated on an overall observation object in normal fluorescent observation, fluorescent information of the position other than the place to be observed (the position that is out of focus) is also acquired simultaneously. Therefore, a contrast is lowered, and observation of a minute unit such as, for example, one molecule, cannot be made.

In recent years, the technology for illuminating only a minute area such as several tens to several hundreds nm is established by using an evanescent light generated on the total reflection of light as an illumination light. Accordingly, the fluorescent observation of a minute unit at one molecule level becomes possible by preventing lowering of the contrast that is a problem of the normal fluorescent observation.

The evanescent light is a light generated by totally reflecting an illumination light when the illumination light is inputted on a boundary face having a different refractive index at an angle of a predetermined value or less. In addition, the evanescent light has a property that it does not propagate through a free space located in an area of which size is smaller than that of a wave length at the opposite side of the illumination light with respect to the above boundary face.

In a biological study, a method so-called time lapse is frequently employed in order to observe change over time within the live cell. An object of this method is to analyze a function of the interior of the cell by acquiring an observation image continuously or at predetermined intervals in a period of time, for example, one day or two days.

According to the method, the observation for a long time is required. However, a microscope that is an observation device is an assembly of a metal and a glass. For example, only if the internal temperature of a room where the experiment is conducted is slightly changed, a problem such that the microscope is transformed and a point of focus is deviated occurs. Particularly, this is a serious problem in the florescent observation using the evanescent light used to observe the minute area from several tens to several hundreds nm.

Jpn. Pat. Appln. KOKAI Publication No. 2003-270524 discloses means for detecting a position of a part of a cell located in an evanescent field with a high degree of accuracy by using an evanescent light dedicated for focus detection.

BRIEF SUMMARY OF THE INVENTION

A focus detection device which is applied to a fluorescent observation device for observing a fluorescent image to be emitted from an observation sample on the basis of an evanescent light, according to an aspect of the present invention is characterized by comprising: an image pickup unit which detects a contrast of the fluorescent image by imaging the fluorescent image; and a detector which detects a focus on the basis of the detection result.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the accompanying drawings.

First Embodiment

Figure 1:
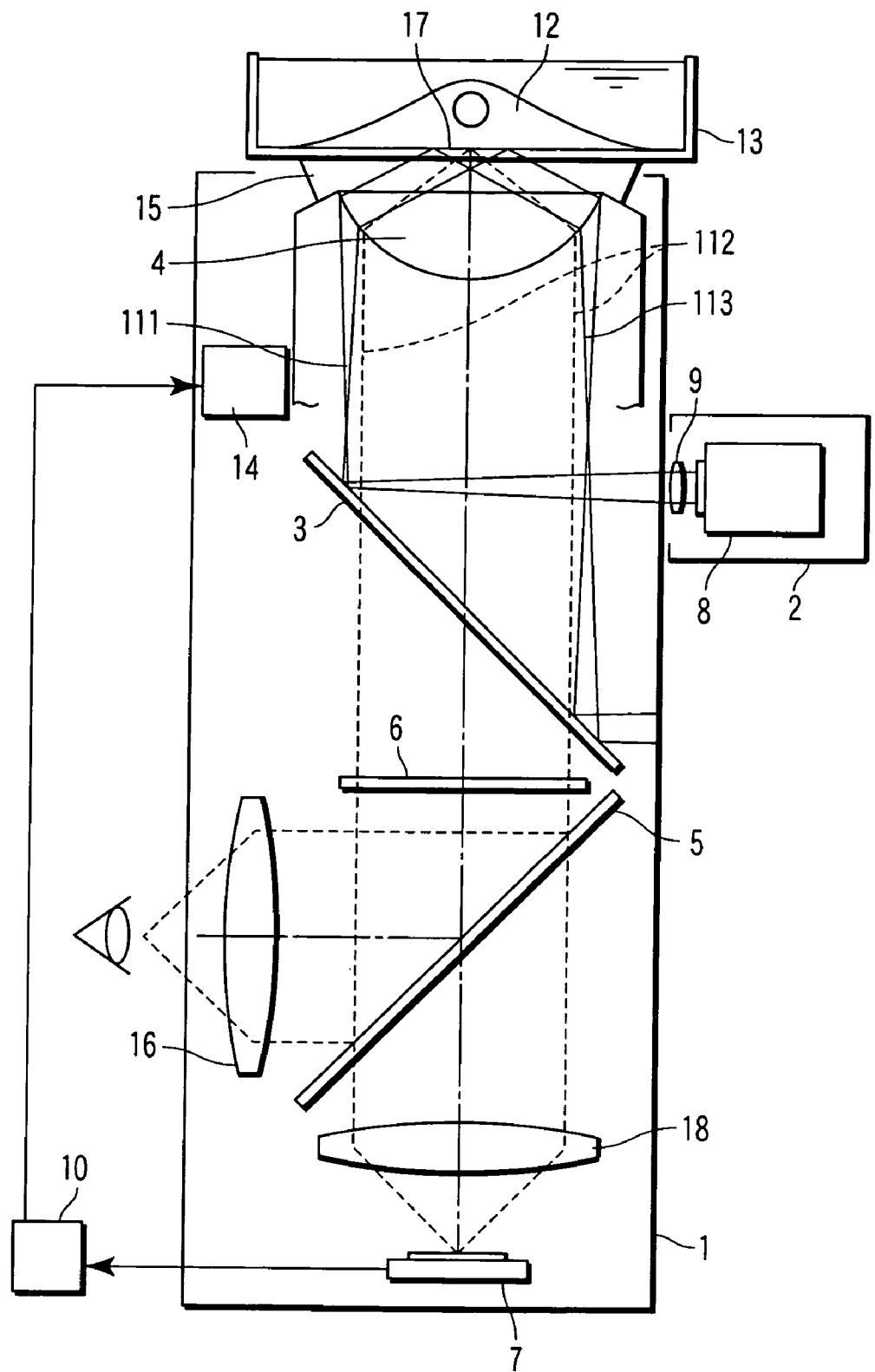
FIG. 1 illustrates a schematic configuration of a fluorescent observation device according to a first embodiment of the present invention.

FIG. 1 illustrates a schematic configuration of a fluorescent observation device according to a first embodiment of the present invention. The first and thereafter embodiments of the invention will be described by using an inverted incident-light fluorescence microscope as a fluorescent observation device.

In FIG. 1, as same as a general inverted incident-light fluorescence microscope, a microscope main body 1 has an illuminating unit 2, a dichroic mirror 3, an objective lens 4, a half mirror 5, an optical filter 6, and an image pickup device (such as a CCD camera) 7 as an optical detector and they are arranged so that their optical axes coincide with one another.

In the illuminating unit 2, an irradiation light source 8 for emitting a laser beam of a predetermined wave length that excites a sample (a live cell) 12 to be described later and a condenser lens 9 are arranged so that their optical axes coincide with each other. In addition, the laser beam emitted from the irradiation light source 8 is adjusted so as to be condensed to a focal position at the rear side of the objective lens 4 via the dichroic mirror 3.

The dichroic mirror 3 is set so as to reflect the light of a predetermined wave length of an illumination light 111 from the irradiation light source 8 and to transmit through the wave length of a fluorescence light 112 having a longer wave length than that of the illumination light 111 to be described later. The objective lens 4 is composed of an oil immersion objective lens having a high numerical aperture which satisfies the condition of NA (numerical aperture of objective lens)>n (refractive index of observation sample).

The sample 12 is arranged above the objective lens 4. The sample 12 is firmly attached on a cover glass 13 mounted on a stage (not shown) of the microscope main body 1. The cover glass 13 is filled with an aqueous solution that is necessary for the organic activity of the sample 12, namely, the live cell. The sample 12 is located at a focal position of the objective lens 4 via oil 15 having substantially the same refractive rate as that of the cover glass 13.

The laser beam of the irradiation light source 8 reflected on the dichroic mirror 3 is inputted as the illumination light (exciting light) 111 in the objective lens 4 with a small luminous flux diameter passing through an outer circumferential portion of the objective lens 4, and adjusted into an incident angle at which the laser beam is totally reflected on the cover glass 13. Then, the laser beam is totally reflected on the cover glass 13 to generate an evanescent light 17 at the side of the sample 12. The evanescent light 17 is localized at the side of the sample 12 of the cover glass 13 in a shorter distance than the wave length of its illumination light. After being totally reflected on the cover glass 13, the illumination light 111 is condensed at the focal position at the rear side of the objective lens 4 that is axis symmetric to the illumination light 111 with respect to a center axis of the objective lens 4, and the illumination light 111 is reflected on the dichroic mirror 3 as a feedback light 113 to be shielded at the inner face of the microscope main body 1.

On the other hand, a minute fluorescent light 112 (represented by a broken line) emitted from the sample 12 to be excited by the evanescent light 17 transmits through the dichroic mirror 3 and enters the half mirror 5 via the optical filter 6. The half mirror 5 can be inserted and detached in and from the observation optical axis. When the half mirror 5 is inserted in the optical axis, the minute fluorescent light 112 is divided. Then, one divided fluorescent light can be observed via an eyeglass 16, and the other divided fluorescent light is inputted in the image pickup device 7. When the half mirror 5 is pulled out from the optical axis, the fluorescent light 112 is entirely introduced into the image pickup device 7.

The optical filter 6 constitutes an observation optical system together with the dichroic mirror 3 and the like, and a light with a specific wave length can selectively transmit through the optical filter 6. In this case, as the optical filter 6, an optical filter that shields the light with the wave length of the illumination light 111 and allows the light of the fluorescent light 112 of which wave length is longer than that of the illumination light 111 to transmit therethrough is used.

The fluorescent light 112 from the sample 12 transmits through the optical filter 6 to be observed as a fluorescent image by the eyeglass 16 and be imaged by the image pickup device 7 via an image pickup lens 18.

A control unit 10 moves the focal position of the objective lens 4 by moving the objective lens 4 along an optical axial direction using a position control unit 14. Thereby, a plurality of fluorescent images of the fluorescent light 112 are acquired by the image pickup device 7 to obtain a difference of their contrasts.

Based on the contrast difference, the position control unit 14 is controlled so that the focal positions of the observation sample 12 and the objective lens 4 may overlap with each other, thereby moving the objective lens 4 vertically.

Note that the detection of the point of focus due to the fluorescent image can be performed not only from the contrast difference but also from the intensity distribution of the image or the like.

According to the above-described configuration, a focus detection and focusing are allowed using the image of the fluorescent light 112 emitted from a part of the sample 12 located in the range of the very weak evanescent light 17 such as several tens to several hundreds nanometers.

The advantage of the focus detection combined with the evanescent light with a high degree of accuracy is obtained. In other words, since the fluorescent light 112 emits light only in the range of the evanescent light 17 such as several tens to several hundreds nanometers, the focus detection can be made with the accuracy of several tens to several hundreds nanomete.

In addition, in time lapse for observing change over time within the live cell according to the biological study, the observation for a long time is required. However, an microscope that is an observation device is an assembly of a metal and a glass. For example, only if the internal temperature of a room where the experiment is conducted is slightly changed, a problem such that the microscope is thermal-deformed and a point of focus is deviated occurs. Particularly, this is a serious problem in the florescent observation using the evanescent light used to observe the minute area from several tens to several hundreds nm. However, according to the present embodiment, the focus detection is carried out by using the image of the fluorescent light 112 during observation, so that, even if the microscope or the like is thermal-deformed, it is possible to continue the observation for a long time while taking the focus. In addition, if the laser beam having a wave length longer than that of the laser beam for use in observation is separately prepared and used, it is possible to prevent color degradation of the fluorescent light.

According to the first and the rest embodiments, the explanation is made by using the inverted incident-light fluorescence microscope as the fluorescent observation device. However, the present invention is not limited to this, and the invention can be applied to any device which can realize a focused focal point by using a fluorescent light.

Second Embodiment

Figure 2:
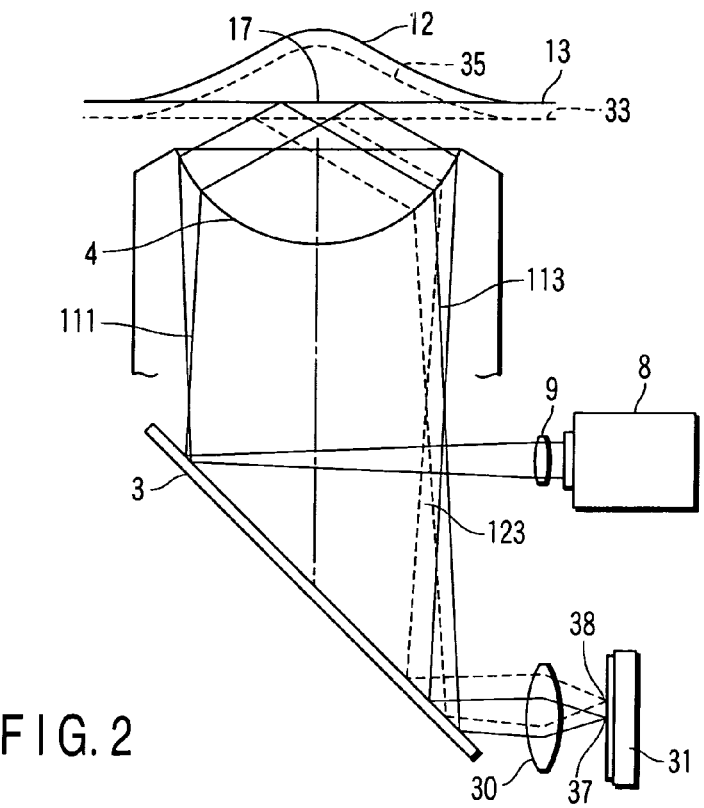
FIG. 2 illustrates a schematic configuration of a fluorescent observation device according to a second embodiment of the present invention.

FIG. 2 illustrates a schematic configuration of a fluorescent observation device according to a second embodiment of the present invention. In FIG. 2, the same elements as those in FIG. 1 are given the same reference numerals.

According to the second embodiment, a condenser lens 30 and a detector 31 as a focus detection device system are newly added to the optical axis of the observation optical system in the device according to the first embodiment.

In the first embodiment, the feedback light 113 is shielded. However, according to the present embodiment, as shown in FIG. 2, the feedback light 113 is not shielded but is condensed backward of a detection point 37 of the detector 31 by the condenser lens 30.

In the above-described configuration, it is shown that the coherence face between the cover glass 13 and the sample 12 coincides with the focal position of the objective lens 4, and a position 33 (represented by a broken line) of the cover glass 13 shows the state that the cover glass moves downward from the focal position of the objective lens 4. When the cover glass 13 moves to the position 33, the feedback light 113 of the illumination light 111 moves to a position of a feedback light 123. Specifically, as shown in FIG. 2, the reflection face of the illumination light 111 moves along a lower direction. Consequently, an optical path of the feedback light 123 moves to the optical path at the side of the optical axis from the feedback light 113, and the condensing position by the condenser lens 30 moves from the detection point 37 to a detection point 38.

In consideration of the case where the cover glass face 13 moves upward from the focal position of the objective lens 4, the feedback light of the illumination light 111 passes through the optical path (not shown) at the opposite side of the detection point 38 with respect to the detection point 37.

Accordingly, first, the position of the detection point 37 of the detector 31, which is the condensing position by the condenser lens 30 when the light is brought to a focus, is stored. Then, when the condensing position is deviated from the detection point 37, this means that the light is out of focus. Therefore, by moving the objective lens 4, the condensing position is returned to the position of the detection point 37 where the light is brought to a focus.

As described above, the condensing position of the feedback light to the detector 31 is detected, and the condensing position is allowed to coincide with the detection point when the focal points are focused, thereby making it possible to obtain the focused focal point of the objective lens 4. Consequently, as same as the first embodiment, it is possible to continue the observation for a long time while taking the focus even if the microscope is thermo-deformed.

Depending on the position of the feedback light detection point, which feedback light is condensed in the detector 31, it is known that the coherence face between the cover glass 13 and the sample 12 is located upward or downward in the optical axial direction with respect to the focal position, so that it is possible to determine the adjustment direction when adjusting the focal point for a short time.

According to the present embodiment, the detection point 38 of the feeding light may be offset as a focal position when a user wish to take the focus of the objective lens 4 on a position different from the coherent face between the cover glass 13 and the sample 12 (here, the coherent face between the cover glass face 33 and the sample). Further, if the illumination light 111 is condensed at the pupil position of the objective lens 4, the evanescent light 36 is not changed.

Thereby, in addition to the above-described advantages, it is possible to detect the focal position while offsetting the focus of the objective lens 4 at a different position from the coherence face between the cover glass 13 and the sample 12.

Further, in the illumination light 111, a depth of penetration of the evanescent light 17 can be changed by an incident angle to the cover glass face 13. After changing the depth of penetration of the evanescent light 17, the detection point may be offset as the focal position.

Thereby, in addition to the above-described advantages, it is possible to detect the focal position even if the depth of penetration of the evanescent light 17 is changed.

In addition, by changing the incident angle into the cover glass face 13 of the illumination light 111 for a short time that the cover glass face 13 does not move, the change amount of the detection point of the feedback light thereof may be read.

This makes it possible to obtain the change amount of the depth of penetration of the evanescent light 17.

Figure 3:
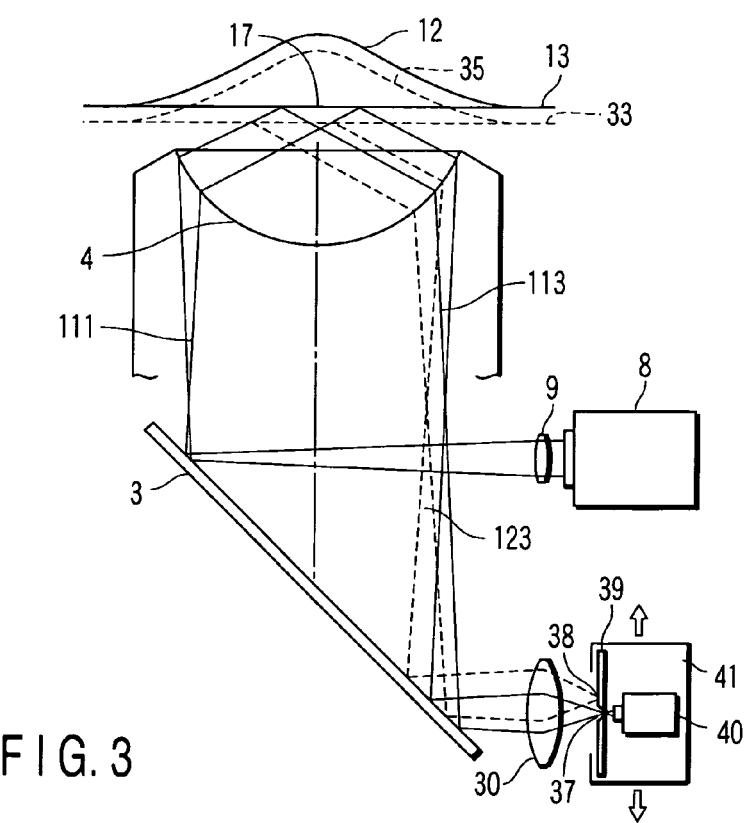
FIG. 3 illustrates a schematic configuration of a fluorescent observation device according to a modified example of the second embodiment of the invention.

As shown in FIG. 3, a face sensor, a line sensor or the like that serves as the detector 31 shown in FIG. 2 may be replaced with a condensing point detector 41 obtained by combining a pin hole 39 and an optical detector 40. In this case, the condensing point detector 41 is moved for detecting the condensing position, and the condensing point is detected by the optical detector 40.

Thereby, in addition to the above-described advantages, the expensive detector 31 is allowed to be replaced with a more inexpensive detector.

Further, the illumination light 111 used for detection of the focus is used as the dedicated light for detecting the focal point, and the light source for illumination may be separately provided.

In addition to the above-described advantages, it is possible to change the wave length of the light source for detecting the focal point into infrared light that hardly gives damage to the sample 12 as the living body.

Third Embodiment

Figure 4:
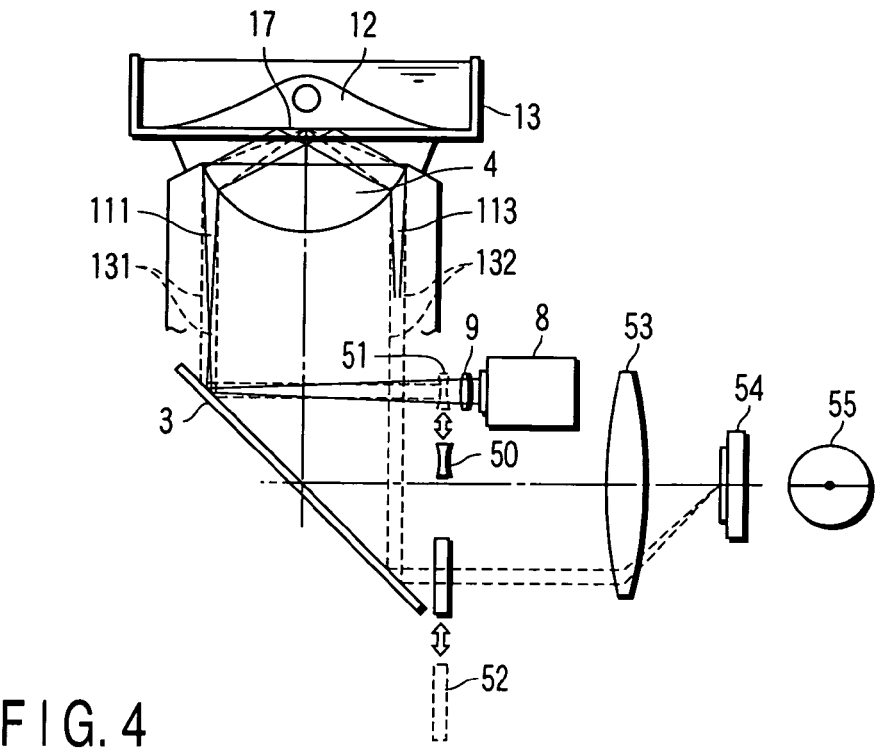
FIG. 4 illustrates a schematic configuration of a fluorescent observation device according to a third embodiment of the present invention.

FIG. 4 illustrates a schematic configuration of a fluorescent observation device according to a third embodiment of the present invention. In FIG. 4, the same elements as FIG. 1 are provided with the same reference numerals.

As shown in FIG. 4, according to the present embodiment, a focus detection lens 50 that is a focus detection light source system, a focus detection lens 53 that is a focus detection device system, and a two-divided detector 54 are newly added to the optical axis of the observation optical system.

According to the present embodiment, the feedback light 113 is configured to enable to select light shielding and transmission by a light shielding plate 52 that can be inserted and detached.

If the focus detection lens 50 is inserted within an illumination optical path, the light shielding plate 52 is pulled out from an optical path of a focus detection feedback light 132, and the focus detection feedback light 132 reaches the two-divided detector 54. If the focus detection lens 50 is pulled out from the illumination optical path, on the other hand, the focus detection feedback light 132 is inserted into the optical path of the feedback light 113 so as to shield the feedback light 113.

The focus detection lens 50 is detachably arranged at a position that is conjugate with the focal point of the condenser lens 9. If the focus detection lens 50 is inserted into the illumination optical path, the illumination light 111 is made into a focus detection light 131. The laser beam inputted in the objective lens 4 as the focus detection light 131 is reflected at the same time as focusing light on the coherence face between the cover glass 13 and the sample 12, and then, the laser beam is made into a focus detection feedback light 132 that is axisymmetric to the focus detection light 131 with respect to the center axis of the objective lens 4. Then, the focus detection feedback light 132 is reflected on the dichroic mirror 3.

The focus detection feedback light 132 reflected on the dichroic mirror 3 is condensed by the focus detection lens 53, of which optical axis coincides with that of the optical axis of the focus detection, and focuses light on the divide portion at the center of the two-divided detector 54, of which optical axis coincides with that of the optical axis of the focus detection. On a condensing face 55 of the two-divided detector 54 in this case, a small condensed light across the both detection elements of the two-divided detector 54 is observed.

Figure 5:
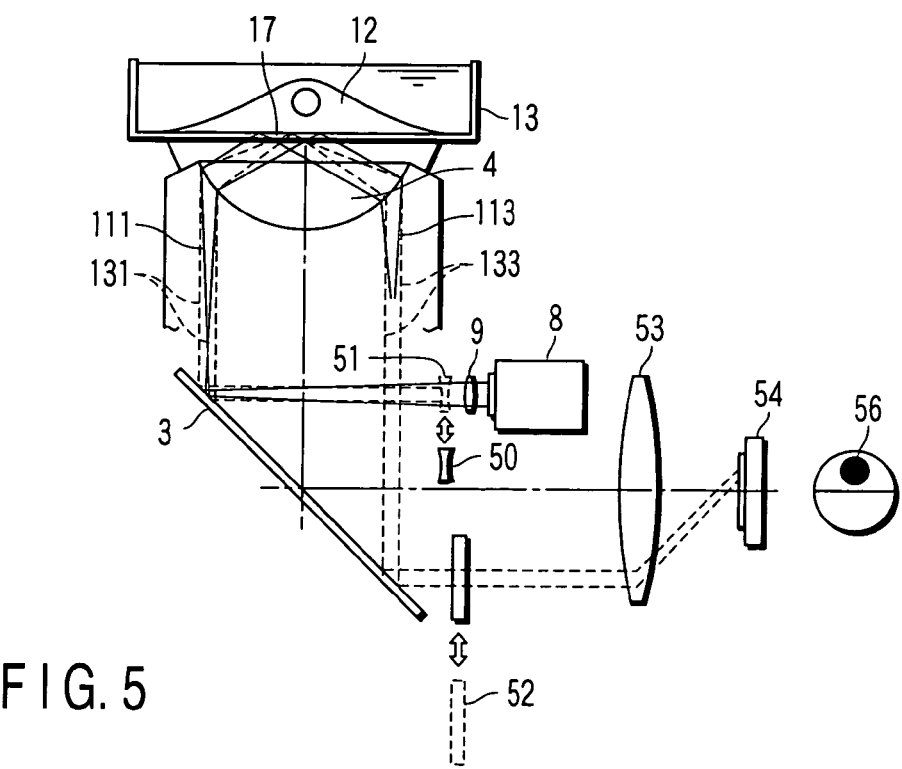
FIG. 5 illustrates a detected position of a focus detection feedback light when a coherent face between a cover glass and a sample moves downward in the third embodiment of the invention.
Figure 6:
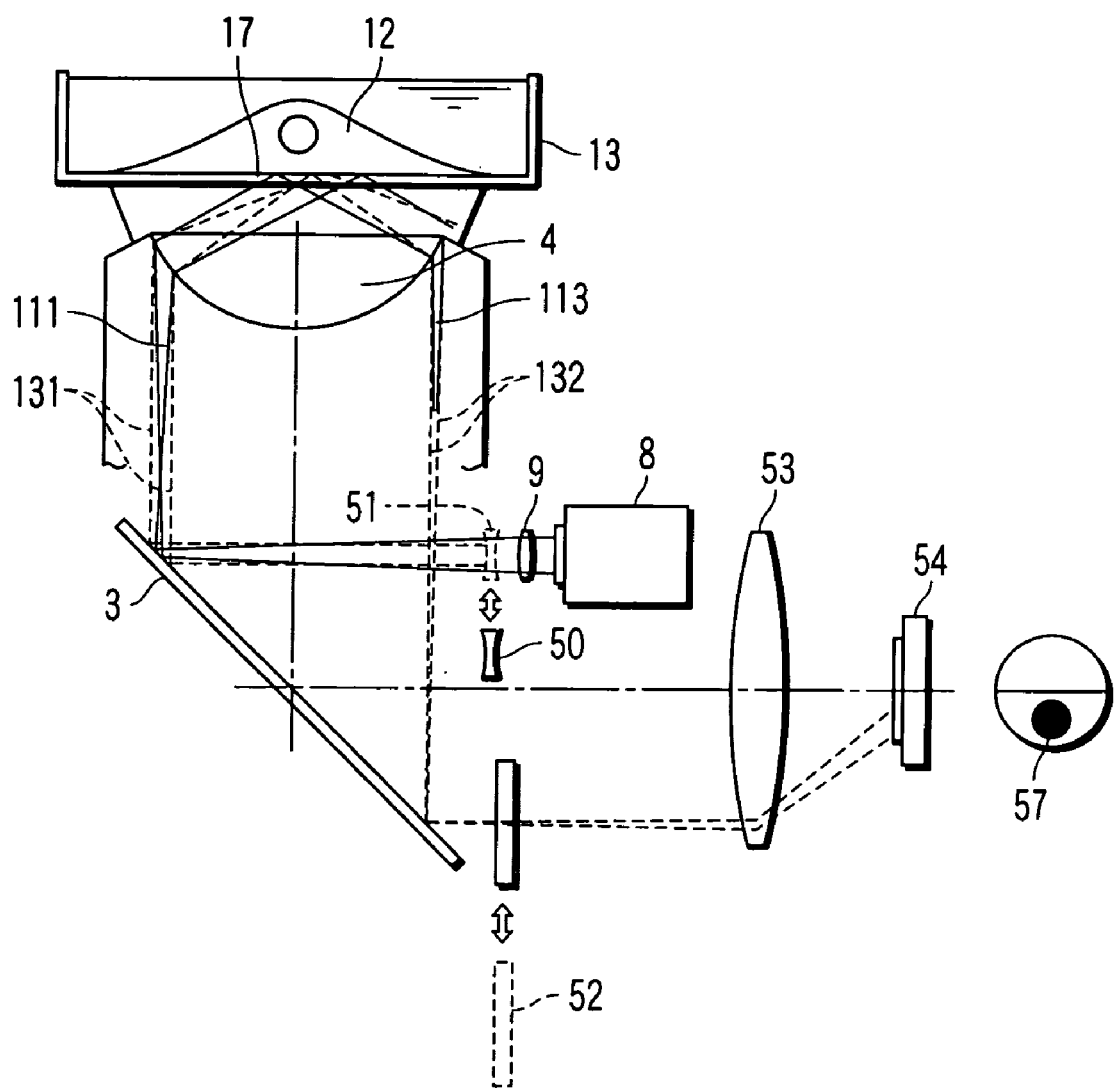
FIG. 6 illustrates a detected position of a focus detection feedback light when a coherent face between a cover glass and a sample moves upward in the third embodiment of the invention.

The divided face of the two-divided detector 54 is constructed so as to be in parallel with the optical axis and be vertical to the face including the axes of the focus detection light 131 and the focus detection feedback light 132. In this case, when the coherent face between the cover glass 13 and the sample 12 moves downward as shown in FIG. 5, the laser beam to be inputted in the objective lens 4 as the focus detection light 131 does not focus on the boundary face between the cover glass 13 and the sample 12 but is reflected to be made into a focus detection feedback light 133. The focus detection feedback light 133 arrives at the position biased from the center of the two-divided detector 54 as it is not condensed. Accordingly, on the condensing face 55 of the two-divided detector 54, an out-of-focus light 56 is observed at the element at the one side of the two-divided detector 54. On the contrary, when the coherent face between the cover glass 13 and the sample 12 moves upward as shown in FIG. 6, a large out-of-focus light 57 biased to the opposite element of the one side element on the two-divided detector 54 is observed.

Therefore, the focal point can be adjusted by adjusting the objective lens into the optical axial direction so that the small condensed light across the both detection elements can be observed on the condensing face 55 of the two-divided detector 54.

As described above, according to the present embodiment, the focal position of the objective lens 4 can be detected while periodically switching the illumination light 111 into the focus detection light 131. Thereby, as same as the first embodiment, it is possible to continue observation while focusing for a long time even if the microscope is thermo-deformed. In addition, since the illumination light is used as the focus detection light, the entire configuration becomes simple and the device can be made at a cheep cost. Further, since the focus detection light is switched to the illumination light only when needed, the damage given to the sample of the live cell or the like can be reduced. Furthermore, also in the focal detection, it can be determined whether the cover glass 13 is located upward the focus face or downward the focus face depending on the fact on which part of the two-divided detector 54 the focus detection feedback light 132 attains, so that the moving direction of the cover glass 13 can be determined only by this.

Fourth Embodiment

Figure 7:
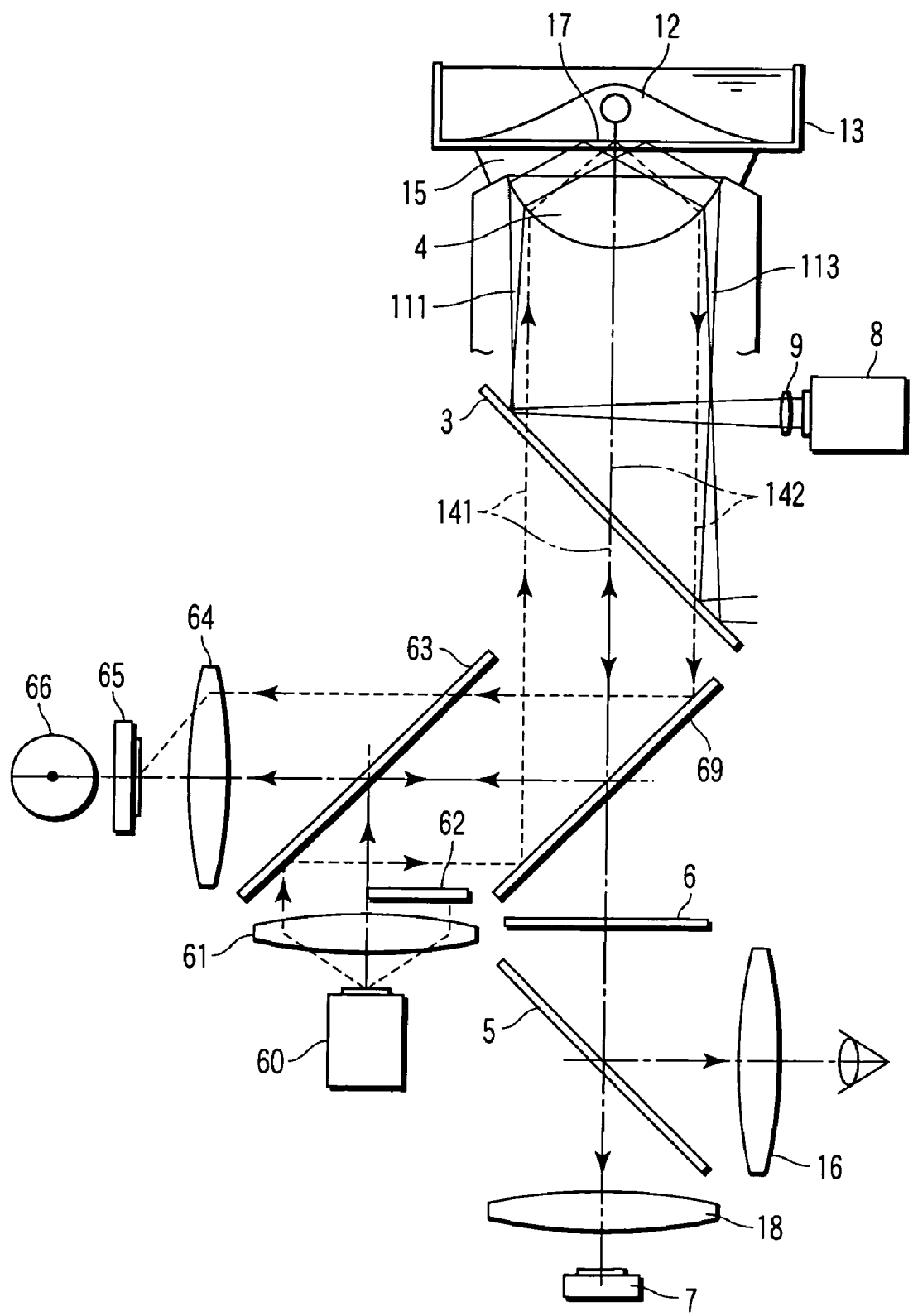
FIG. 7 illustrates a schematic configuration of a fluorescent observation device according to a fourth embodiment of the present invention.

FIG. 7 illustrates a schematic configuration of a fluorescent observation device according to a fourth embodiment of the present invention. In FIG. 7, the same elements as FIG. 1 are provided with the same reference numerals.

As shown in FIG. 7, in the present embodiment, a focus detection light source 60 that is a focus detection light source system, a collimate lens 61, a light shielding plate 62, a semitransparent mirror 63, a dichroic mirror 69 for focus detection, a focus detection lens 64 that is a focus detection device system, a wave length cutting plate 70, and a two-divided detector 65 are newly added to the optical axis of the observation optical system.

In FIG. 7, the illumination system and the observation system are the same as the configuration of the first embodiment. The dichroic mirror 3 is configured to reflect the light of the wave length of the illumination light 111 with a predetermined wave length from the irradiation light source 8, to transmit the wave length of the weak fluorescent light with a long wave length emitted from the sample 12 by excitation of the illumination light 111 to transmit, and to also transmit a focus detection light 141 for use in focus detection with a longer wave length than the wave length of the fluorescent light.

In the illumination system, the feedback light 113 entirely reflected on the cover glass 13 does not leak to the observation optical system, and a light shielding plate 71 is arranged at the side of the sample away from the dichroic mirror 3.

In the focus detection system, the focus detection light source 60 for emitting a laser beam with a predetermined wave length of an infrared range that hardly give a damage to a live cell, and the collimate lens 61 are arranged so that their optical axes coincide with each other. Each of them is adjusted so as to condense the laser beam from the focus detection light source 60 at a focal position of the objective lens 4 via the collimate lens 61, the semitransparent mirror 63, the dichroic mirror 69, and the dichroic mirror 3.

The semitransparent mirror 63 is set so as to semi-transmit the laser beam with a predetermined wave length from the focus detection light source 60 and to reflect the light amount of the left half.

The dichroic mirror 69 is set so as to transmit the wave length of the fluorescent light and to reflect the focus detection light 141, of which wave length is longer than that of the fluorescent light.

The laser beam from the focus detection light source 60 is inputted in the objective lens 4 as the focus detection light 141, of which half is shielded by the light shielding plate 62 arranged at the pupil position of the collimate lens 61. Then, the laser beam is focused and reflected on the coherent face between the cover glass 13 and the sample 12 to be made into a focus detection feedback light 142 that is axisymmetric to the focus detection light 141 with respect to the center axis of the objective lens 4.

The light shielding plate 62 shields a half circular portion of the circular glass plate so as to shield the focus detection light as seen from the section of the focus detection light and it may transmit the left.

The focus detection feedback light 142 reflected on the coherent face between the cover glass 13 and the sample 12 transmits the dichroic mirror 3 and is reflected on the dichroic mirror 69 for focus detection. Then, the half light amount of the focus detection feedback light 142 is reflected on the semitransparent mirror 63 to be shielded by the light shielding plate 62, and the left light amount transmits through the semitransparent mirror 63. The focus detection feedback light 142 having transmitted through the semitransparent mirror 63 is condensed by the focus detection lens 64, of which optical axis coincides with the focus detection optical axis. Then, the focus detection feedback light 142 transmits only through the wave length of the focus detection light source 60 on the wave length cutting plate 70 to be focused at the divided portion of the center of the two-divided detector 65, of which axis coincides with the focus detection optical axis. On a condensing face 66 of the two-divided detector 65, a small condensed light across the both detection elements of the two-divided detector 65 is observed.

The divided face of the two-divided detector 65 is composed of the same face as the face being in parallel with the optical axis and including a dividing line between the focus detection light 141 and the focus detection feedback light 142.

Thereby, it is possible to detect the state that the objective lens 4 is focused on the coherent face between the cover glass 13 and the sample 12.

Figure 8:
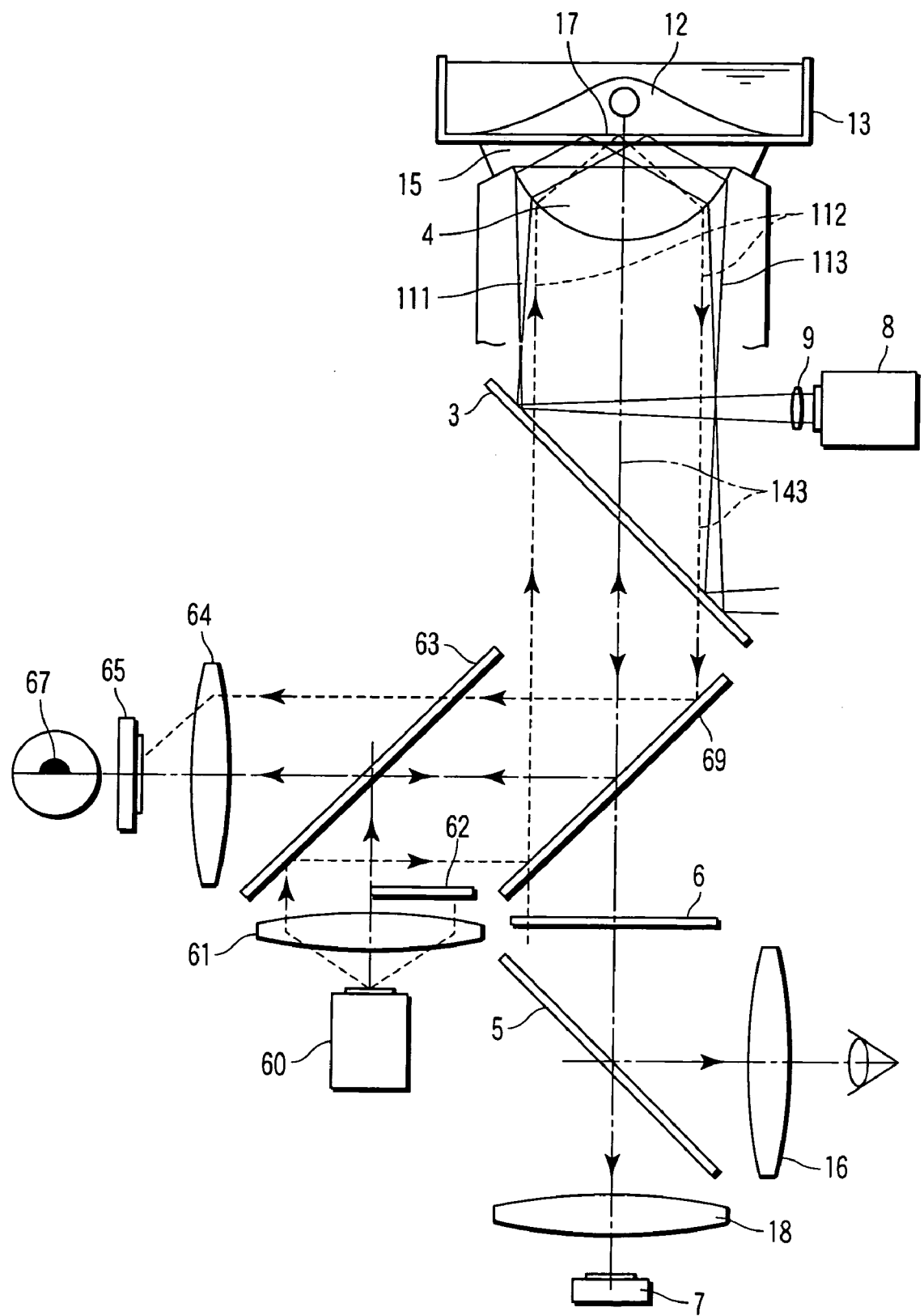
FIG. 8 illustrates a detected position of a focus detection feedback light when a coherent face between a cover glass and a sample moves downward in the fourth embodiment of the invention.
Figure 9:
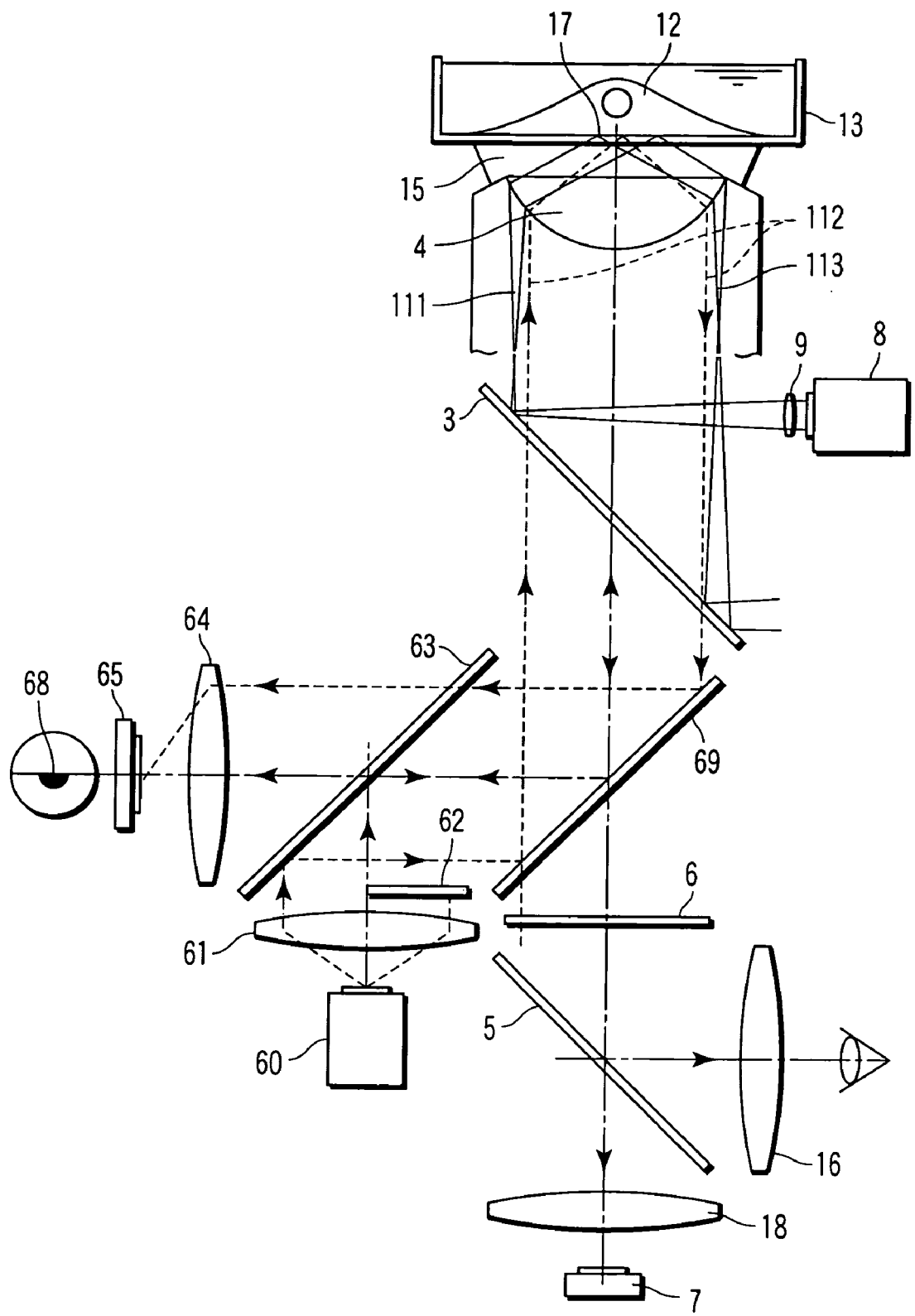
FIG. 9 illustrates a detected position of a focus detection feedback light when a coherent face between a cover glass and a sample moves upward in the fourth embodiment of the invention.

In FIG. 8, when the cover glass 13 moves downward, the laser beam to be inputted in the objective lens 4 as the focus detection light 141 is not focused on the coherent face between the cover glass 13 and the sample 12 but is reflected thereon. Then, the laser beam is made into a focus detection feedback light 143 that transmits through the objective lens 4 but is not the collimate light. The focus detection feedback light 143 is introduced to the two-divided detector 65, and attains to the position biased from the center of the two-divided detector 65 as it is not condensed. Accordingly, on the condensing face 66 of the two-divided detector 65, a large out-of-focus light 67 is observed, which is biased to the element at one side of the two-divided detector 65. On the contrary, when the cover glass 13 moves upward as shown in FIG. 9, a large out-of-focus light 68 is observed, which is biased to the element opposite to the detection element of the two-divided detector 65 when the cover glass 13 moves downward.

As described above, focusing is adjusted by adjusting the objective lens into the optical axial direction so that the small condensed light across the both detection elements can be observed on the condensing face of the focus detection device.

According to the present embodiment, it is always possible to detect the focal position of the objective lens while observing the fluorescence image. Since the light source of the illumination light 111 is different from the light source of the focus detection light 141, the damage to be given to the sample such as the live cell can be reduced by using the infrared light or the like for the focus detection light 141. Further, also in the focus detection, it can be determined whether the cover glass 13 is located upward the focus face or downward the focus face depending on the fact on which part of the two-divided detector 65 the focus detection feedback light 142 attains. Therefore, it is possible to determine the moving direction of the cover glass 13 only by this upon adjustment of focus. Furthermore, even when the incident angle into the cover glass 13 of the illumination light 111 is changed and the depth of penetration of the evanescent light 17 is changed, the focus detection is carried out at the entirely different light source, so that there is no impact on the focus detection. In addition, as same as the first embodiment, it is possible to continue the observation for a long time while taking the focus even if the microscope or the like is thermal-deformed. Moreover, by offsetting the focal position in the two-divided detector 65, the focus detection can be made while observing the image even if the focal position of the objective lens 4 is far from the coherence face between the cover glass 13 and the sample 12.

Fourth Embodiment

Figure 10:
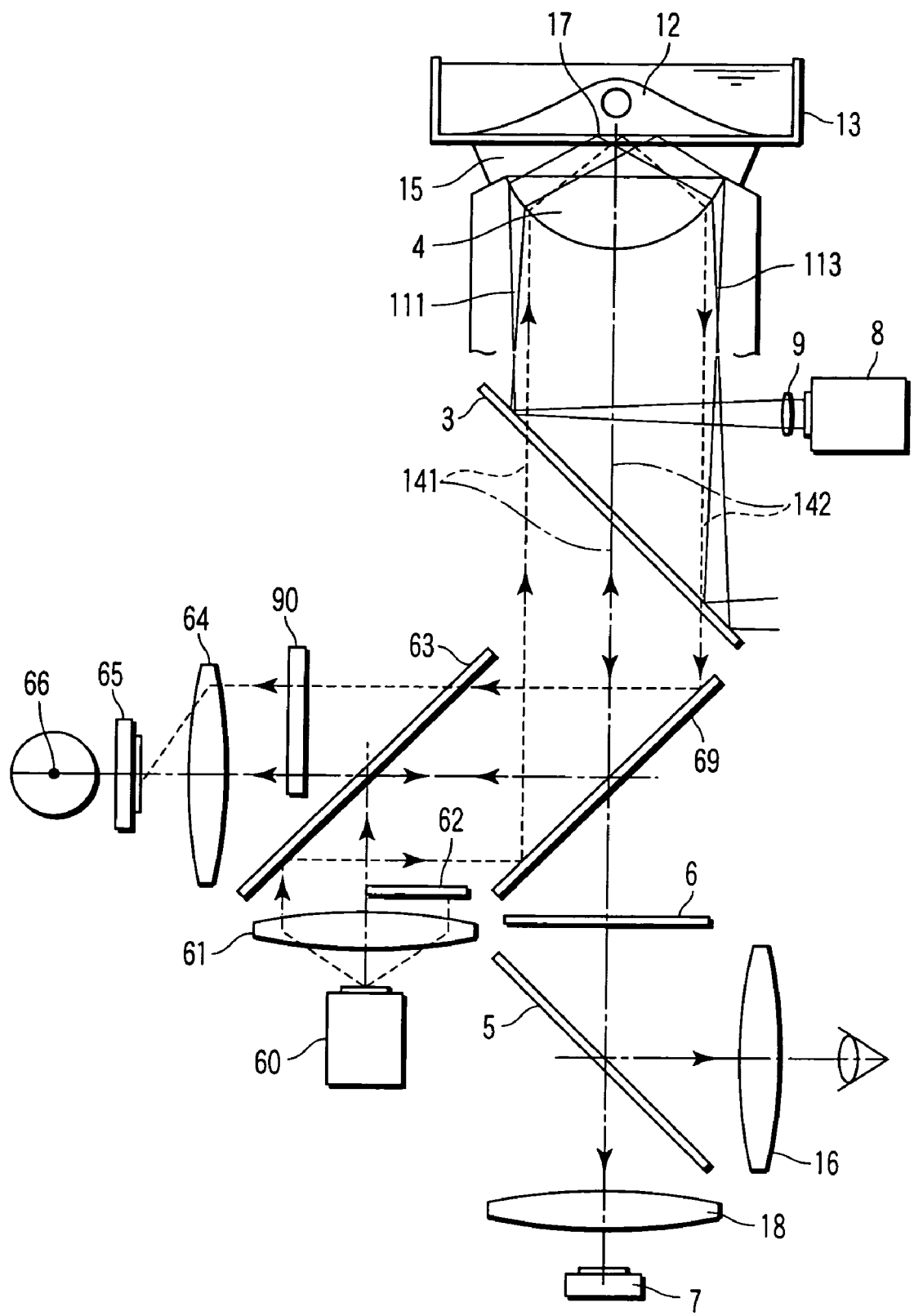
FIG. 10 illustrates a schematic configuration of a fluorescent observation device according to a modified example of the fourth embodiment of the invention.

FIG. 10 illustrates a schematic configuration of a fluorescent observation device according to a modified example of the fourth embodiment of the invention. In FIG. 10, the same elements as FIG. 7 are given the same reference numerals.

In the present modified example, a filter 90 is added to the configuration of the fourth embodiment as shown in FIG. 10. The filter 90 transmits only the focus detection feedback light 142 therethrough and absorbs the light of the other wave length. Thereby, the light other than the focus detection feedback light 142 is not inputted into the two-divided detector 65, and consequently, the detection accuracy of the focus is further improved in addition to the advantage of the fourth embodiment.

Note that the filter 90 is preferably located from the dichroic mirror 69 for focus detection to the two-divided detector 65. Further, it is preferable that the filter 90 is arranged in the place other than the observation optical path. Since the other configurations are the same as the fourth embodiment, the explanation thereof is herein omitted.

Fifth Embodiment

Figure 11:
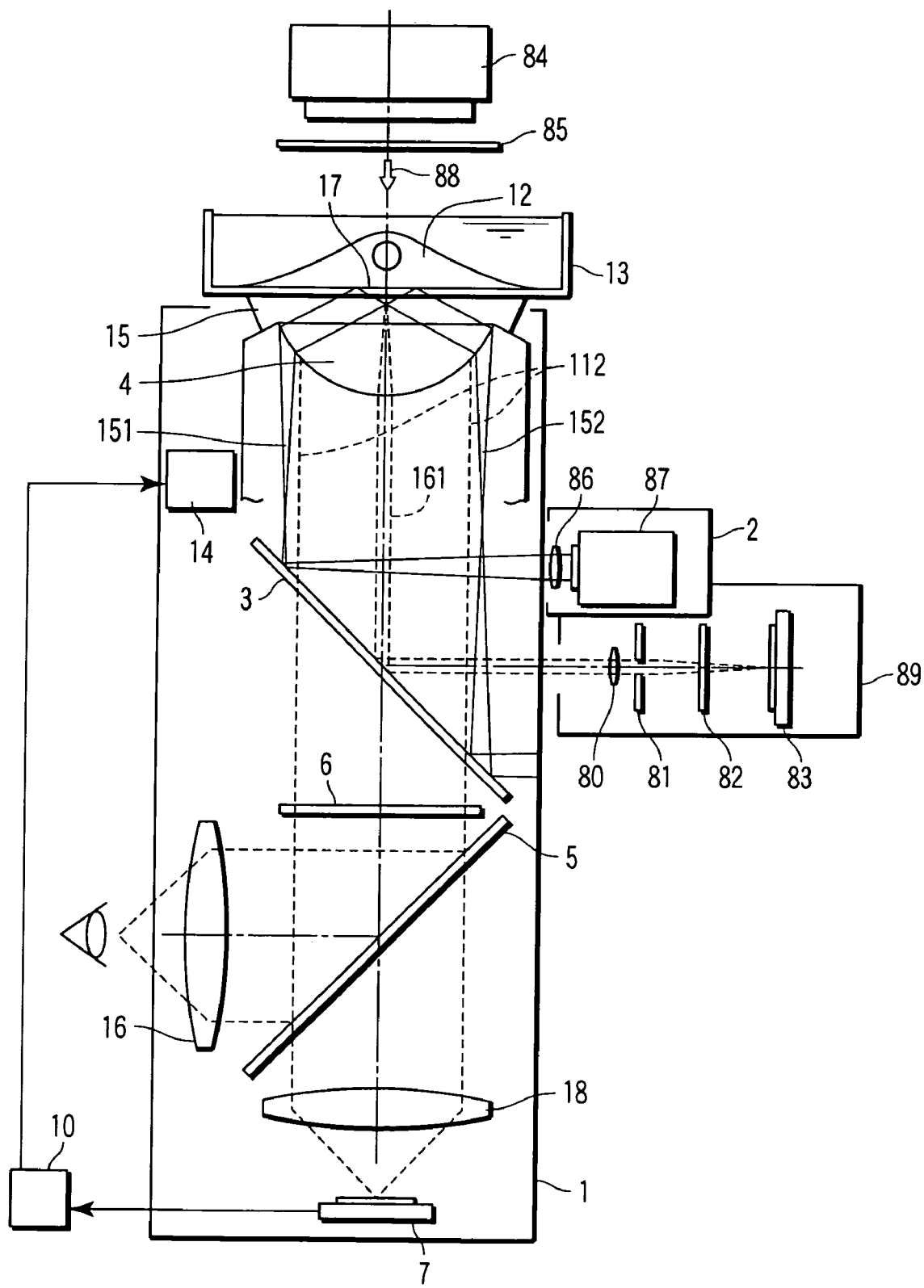
FIG. 11 illustrates a schematic configuration of a fluorescent observation device according to a fifth embodiment of the present invention.

FIG. 11 illustrates a schematic configuration of a fluorescent observation device according to a fifth embodiment of the present invention. In FIG. 11, the same elements as FIG. 1 are given the same reference numerals.

In FIG. 11, as same as the general inverted incident-light fluorescence microscope, the microscope main body 1 has an illumination light source 84, the objective lens 4, the dichroic mirror 3, the optical filter 6, the half mirror 5, and the image pickup device 7, a focus detection light source 87, and a focus detection device 89 which serve as an optical detector, and they are arranged so that their optical axes coincide with one another. The illumination light from the illumination light source 84 irradiates the sample 12 by passing through an excitation filter 85 that transmits only the light with a predetermined wave length to excite the sample 12. The objective lens 4 is composed of an oil immersion objective lens having a high numerical aperture which satisfies the condition of NA (the numerical aperture of the objective lens) >n (the refractive index of the observation sample).

The sample 12 is arranged above the objective lens 4. The sample 12 is firmly attached on the cover glass 13 mounted on a stage (not shown) of the microscope main body 1. The cover glass 13 is filled with an aqueous solution that is necessary for the organic activity of the sample 12, namely, the live cell. The sample 12 is located at a focal position of the objective lens 4 via oil 15 having substantially the same refractive rate as that of the cover glass 13.

Due to the excitation of an illumination light 88, a weak fluorescent light 112 emitted from the sample 12 transmits the objective lens 4 and the dichroic mirror 3 and is inputted into the half mirror 5 via the optical filter 6. The half mirror 5 can be inserted and detached in and from the observation optical axis. When the half mirror 5 is inserted in the optical axis, it divides the fluorescent light 112. Then, one divided fluorescent light can be observed via the eyeglass 16, and the other divided fluorescent light is inputted in the image pickup device 7. When the half mirror 5 is pulled out from the optical axis, on the other hand, the fluorescent light 112 is entirely introduced into the image pickup device 7. The optical filter 6 constitutes an observation optical system together with the dichroic mirror 3 and the like, and the light with a specific wave length can selectively transmit through the optical filter 6. In this case, as the optical filter 6, an optical filter that shields the light with the wave length of the illumination light 88 and the light with the wave length of the focus detection light 151 and allows the light of the fluorescent light 112 of which wave length is longer than that of the illumination light 88 to transmit therethrough is used. The fluorescent light 112 from the sample 12 transmits through the optical filter 6 to be observed as a fluorescent image by the eyeglass 16 and be imaged by the image pickup device 7.

In the focus detection system, the focus detection light source 87 for emitting the laser beam with a predetermined wave length of the infrared range that hardly give damage to the sample as the live cell, and a condenser lens 86 are arranged so that these optical axes coincide with each other, and they are adjusted so as to condense the laser beam from the focus detection light source 87 at the focal position at the rear side of the objective lens 4 via the condenser lens 86 and the dichroic mirror 3.

The dichroic mirror 3 is set so as to transmit the wave length of the fluorescent light of which wave length is longer than that of the an excitation light 88, to reflect the focus detection light 151 of a predetermined wave length in the infrared range from the focus detection light source 87, and not to transmit the excitation light 88.

The laser beam of the focus detection light source 87 reflected by the dichroic mirror 3 is irradiated to the sample 12 via the objective lens 42 as the focus detection light 151.

The focus detection light 151 is adjusted at the incident angle at which the laser beam is totally reflected on the coherent face between the cover glass 13 and the sample 12 with a small luminous flux diameter passing through an outer circumferential portion of the objective lens 4 to generate the evanescent light 17 at the side of the sample 12. The evanescent light 17 is localized at the side of the sample 12 of the cover glass 13 in a shorter distance than the wave length of its focus detection light 151. After being totally reflected on the cover glass 13, the focus detection light 151 is condensed at the focal position at the rear side of the objective lens 4 that is axisymmetric to the focus detection light 151 with respect to a center axis of the objective lens 4, and the focus detection light 151 is reflected on the dichroic mirror 3 as a feedback light 152 to be shielded at the inner face of the microscope main body 1.

If the evanescent light 17 abuts against the sample 12, its scattering light 161 is generated. The scattering light 161 is reflected on the dichroic mirror 3 to enter the focus detection device 89.

The focus detection device 89 is composed of a condenser lens 90, a pin hole 81, a filter 82, and a detector 83, and each of them coincides with the optical axis of the microscope main body 1. The scattering light 161 is condensed in the detector 83 by the condenser lens 80. The pin hole 81 is arranged at the pupil position of the condenser lens 80, and the unnecessary light other than a scattering light 114 at the center of the eyesight to which the user wishes to focus is largely cut. The filter 82 for transmitting only the wave length of the scattering light 161 that is a predetermined wave length of the infrared range and removing the wave length other than this such as the illumination light 88 is provided between the pin hole 81 and the detector 83.

In the control unit 10, the objective lens 4 is moved in the optical axial direction by using the position control unit 14 and thereby, the focal position of the objective lens 4 is moved in the optical axial direction. As a consequence, a plurality of images of the scattering light 161 are acquired by the detector 83 to obtain the intensity difference or the like of its signal. Based on the intensity difference, the position control unit 14 is controlled assuming that the state that the signal intensity becomes the maximum is the state that the focal positions of the observation sample 12 and the objective lens 4 may overlap with each other, thereby moving the objective lens 4 to the position where the signal intensity of the objective lens 4 becomes the maximum.

According to the present embodiment, the focus detection and focusing are possible by using the image of the scattering light 161 emitted from a part of the sample 12 that is located in the range of the very thin evanescent light 17 such as several tens nanometers to several hundreds nanometers.

Since the scattering light 161 emits light only in the range of the evanescent light 17 from several tens nanometers to several hundreds nanometers, the focus detection with the accuracy such as several tens nanometers to several hundreds nanometers can be obtained as the advantage.

In addition, in time laps for observing change over time within the live cell according to the biological study, the observation for a long time is required. However, the microscope that is the observation device is an assembly of a metal and a glass. For example, only if the internal temperature of a room where the experiment is conducted is slightly changed, a problem such that the microscope is thermal-deformed and a point of focus is deviated occurs. Particularly, this is a serious problem in the florescent observation using the evanescent light used to observe the minute area from several tens to several hundreds nm. However, according to the present embodiment, the focus detection is carried out by using the scattering light of the sample during observation. Therefore, even if the microscope or the like is thermal-deformed, it is possible to continue the observation for a long time while taking the focus. In addition, since the image at the place where the user wishes to focus is only selected by the pin hole 81, the accuracy of the focus detection can be improved by removing the image unrelated to the focal point.

According to the present invention, in the fluorescent observation of the high contrast using the evanescent light, it is possible to realize the high focal focusing without impact on the state of the cell that is a test sample or the like.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A fluorescent observation device including a focus detection system, the fluorescent observation device comprising:
    an objective lens for observation of a sample;

a transparent member which has a refractive index that is different from a refractive index of the sample, and which meets the sample at a boundary face;

an illumination optical system which projects illumination light via the objective lens to be totally reflected at the boundary face such that evanescent light is generated to excite the sample;

an observation optical system for observation of weak fluorescent light emitted from the sample when the sample is excited by the evanescent light;

a focus detecting optical system which projects focus detection light for auto-focusing on the boundary face via the objective lens;

a dichroic mirror which is provided at the observation optical system, and which reflects the focus detection light and transmits the fluorescent light; and a detector which receives the focus detection light reflected from the boundary face, via the dichroic mirror;

wherein auto-focusing is executed on the boundary face in accordance with a detection result of the focus detection light received by the detector;

wherein the illumination optical system comprises an illumination light source which emits the illumination light and an illumination dichroic mirror which reflects the illumination light and transmits the fluorescent light emitted from the observation sample; and wherein the illumination light source emits laser light as illumination light, and the illumination optical system protects the laser light through an outer peripheral portion of the objective lens.

2. The device according to claim 1, wherein the focus detecting optical system comprises:

a focus detection light source which emits the focus detection light, which reaches the boundary face via the dichroic mirror;

a light shielding plate which shields the focus detection light in a semicircle along a sectional direction;

an image-forming lens which condenses the focus detection light reflected at the boundary face and traveling to the detector, which receives the focus detection light subjected to image-forming by the image-forming lens; and a filter which is provided between the dichroic mirror and the detector, and which transmits the reflected light of the focus detection light traveling to the detector.

3. A fluorescent observation device including a focus detection system, the fluorescent observation device comprising:

an objective lens for observation of a sample;

a transparent member which has a refractive index that is different from a refractive index of the sample, and which meets the sample at a boundary face;

an illumination optical system which projects illumination light via the objective lens to be totally reflected at the boundary face such that evanescent light is generated to excite the sample;

an observation optical system for observation of weak fluorescent light emitted from the sample when the sample is excited by the evanescent light;

a focus detection optical system which protects focus detection light for auto-focusing on the boundary face via the objective lens;

a dichroic mirror which is provided at the observation optical system, and which reflects the focus detection light and transmits the fluorescent light; and a detector which receives the focus detection light reflected from the boundary face, via the dichroic mirror;

wherein auto-focusing is executed on the boundary face in accordance with a detection result of the focus detection light received by the detector; and wherein the focus detecting optical system comprises:

a focus detection light source which emits the focus detection light, which reaches the boundary face via the dichroic mirror;

a light shielding plate which shields the focus detection light in a semicircle along a sectional direction;

an image-forming lens which condenses the focus detection light reflected at the boundary face and traveling to the detector, which receives the focus detection light subjected to image-forming by the image-forming lens; and a filter which is provided between the dichroic mirror and the detector, and which transmits the focus detection light traveling to the detector.

4. The device according to claim 3, wherein a wavelength of the fluorescent light emitted from the sample is different from a wavelength of the focus detection light, and observation via the observation optical system and auto-focusing via the detector are executed simultaneously.

5. The device according to claim 3, wherein the illumination optical system comprises an illumination light source which emits the illumination light and an illumination dichroic mirror which reflects the illumination light and transmits the fluorescent light emitted from the sample.

6. The device according to claim 5, wherein the illumination light source emits laser light as the illumination light, and the illumination optical system projects the laser light through an outer peripheral portion of the objective lens.

7. The device according to claim 3, wherein the focus detecting optical system further comprises a half mirror which reflects the focus detecting light traveling to the boundary face and transmits the focus detecting light traveling to the detector, and the filter is provided between the half mirror and the detector.

* * * * *